J. KERSTEN.
INTEGRAL NUT LOCK, SPRING, AND WASHER.
APPLICATION FILED MAY 10, 1916.

1,221,456.

Patented Apr. 3, 1917.

Inventor
Jacob Kersten
By Moulton & Liviance
Attorneys.

UNITED STATES PATENT OFFICE.

JACOB KERSTEN, OF GRAND RAPIDS, MICHIGAN.

INTEGRAL NUT-LOCK, SPRING, AND WASHER.

1,221,456.      Specification of Letters Patent.      Patented Apr. 3, 1917.

Application filed May 10, 1916. Serial No. 96,630.

*To all whom it may concern:*

Be it known that I, JACOB KERSTEN, a citizen of the United States of America, residing at Grand Rapids, in the county of Kent and State of Michigan, have invented certain new and useful Improvements in Integral Nut-Locks, Springs, and Washers; and I do hereby declare the following to a full, clear, and exact description of the invention, such as will enable others skilled in the art to which it appertains to make and use the same.

This invention relates to an integral nut, spring, and washer, and its object is to provide a cheap and effective device that will operate as a lock nut, a spring, and a washer, to coöperate with a threaded bolt or screw to provide a device that will accomplish an adjustable and yielding, clamping pressure that can be readily adjusted by turning the same about a bolt or screw to increase and decrease the pressure upon anything secured by the bolt, and that will not unintentionally become loosened or changed in adjustment, and to provide the same with various new and useful features hereinafter more fully described and particularly pointed out in the claim, reference being had to the accompanying drawings in which:—

Figure 1:
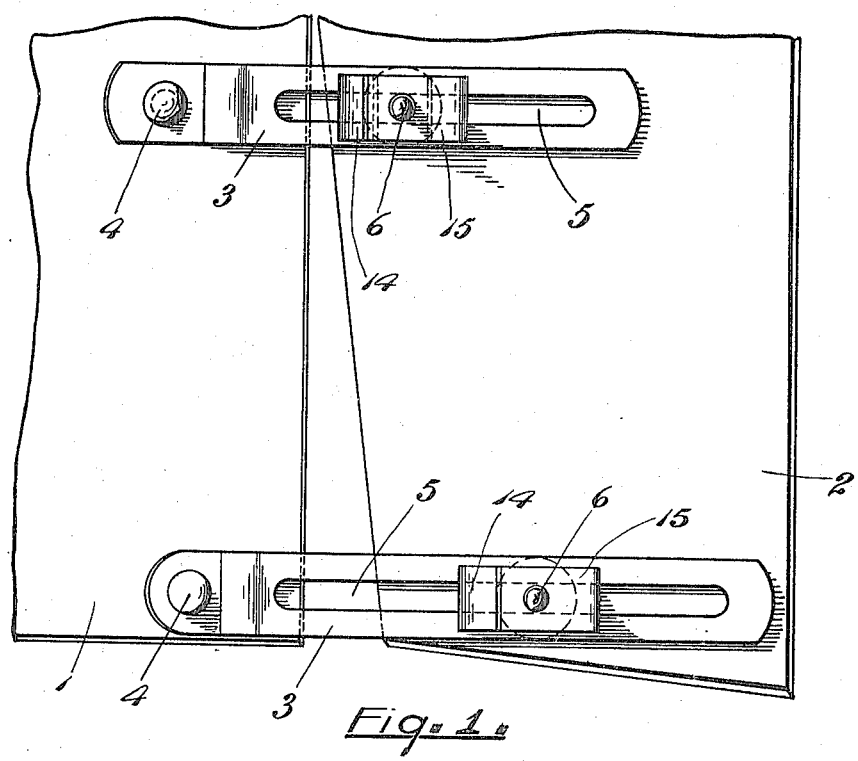

Figure 1 is a plan view of my device applied to slotted arms connecting two relatively adjustable parts of any convenient structure.

Figure 2:
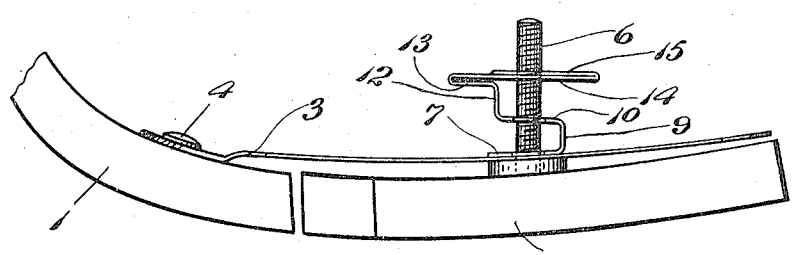

Fig. 2 an end elevation of the same, and

Figure 3:
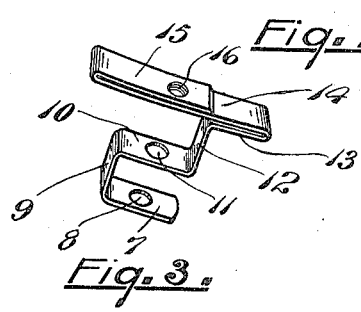

Fig. 3 a perspective view of my device detached.

Like numbers refer to like parts on all the figures.

1 and 2 represent two relatively adjustable parts of any device to which it may be applied, 3 slotted arms connected to the portion 1 of such device by suitable fasteners or rivets 4 and extending parallel to each other near the surface of the other part 2 of the same, each arm being provided with a longitudinal slot 5 through which extends a bolt or screw 6 fixed in the part 2.

My invention consists of an integral strip of suitable flexible material, such as hard brass or steel, bent or folded as hereafter described.

The lower end 7 extends in contact with the arm 3 and is bent or folded as at 9 thence again bent substantially parallel to the portions 7 as at 10 and is thence extended upward as at 12 and thence extended outward a short distance as at 13 and then folded closely upon itself as at 14 and extended parallel with the portion 10 and spaced apart therefrom and thence refolded against itself at 15 and provided with alined perforations at 8, 11, and 16, the perforations 8, and 11 of sufficient size to slip freely over the bolt or screw, and the perforation 16 screw threaded to form a thumb-nut of the parts 14 and 15. The portions 9 and 12 may be curved if preferred.

The portions 13, 14, and 15 extend outwardly from the bolt a sufficient distance to form a suitable thumb-nut and the portions 9, 10, and 12 form practically a spring or yielding connection between the washer portion and the nut portion. The resistance of the spring portion being applied at one side of the bolt or screw tends to lock or bind the nut upon the screw and thus prevents the nut from turning upon the same. The whole structure thus consisting of a single strip of metal formed in substantially the form shown, coöperates with the bolt or screw and performs the functions of a locked thumb nut, a spring, and a washer, which obviously is adapted for use in various relations when a light cheap and inexpensive device is available.

The operation of my device is obvious without further explanation. I do not claim the parts 1, 2, 3, 4, and 5 as they constitute no part of my invention.

What I claim is:—

In a device of the character described a strip of flat resilient metal having a horizontal section at one end thereof, a vertical section bent from an end of said horizontal section and extended for a distance, a second horizontal section bent back over the first mentioned horizontal section and spaced therefrom, a vertical extension at the end of said second horizontal section extending therefrom for a distance and then bent outwardly and horizontally and extended in the same direction as the second horizontal section for a distance, and a third horizontal section bent back over the second horizontal section and spaced therefrom and extended a distance beyond the ends of said second horizontal section, terminating in a part turned back and lying against it, said horizontal sections all having alined openings and the third section and the part lying against it having said openings threaded to receive a bolt or screw.

In testimony whereof I affix my signature.

JACOB KERSTEN.

Copies of this patent may be obtained for five cents each, by addressing the "Commissioner of Patents, Washington, D. C."